United States Patent [19]

McAndrew

[11] 4,354,528
[45] Oct. 19, 1982

[54] POPPET DAMPER WITH GAS FLOW TURNING MEANS

[75] Inventor: Miles J. McAndrew, Wilton, Conn.

[73] Assignee: UOP Inc., Des Plaines, Ill.

[21] Appl. No.: 214,857

[22] Filed: Dec. 10, 1980

[51] Int. Cl.$^3$ .............................................. F16K 11/02
[52] U.S. Cl. ................................. 137/875; 55/341 M; 55/344; 137/625.44; 137/885
[58] Field of Search ............................ 55/341 M, 344; 137/625.44, 875, 885

[56] References Cited

U.S. PATENT DOCUMENTS

| 137,268 | 3/1873 | Wetmore | 137/875 |
| 2,270,775 | 9/1966 | Alderson | 137/609 |
| 3,039,493 | 6/1962 | Licari | 137/625.44 |
| 3,116,756 | 1/1964 | Alderson | 137/610 |
| 3,147,773 | 9/1964 | Matthews et al. | 137/637 |
| 3,183,930 | 5/1965 | Barr | 137/875 |
| 3,537,240 | 11/1970 | Weidinger et al. | 55/306 |
| 4,213,766 | 7/1980 | Wyatt | 55/344 X |

*Primary Examiner*—Gerald A. Michalsky
*Attorney, Agent, or Firm*—James R. Hoatson, Jr.; Barry L. Clark; William H. Page, II

[57] ABSTRACT

Rectangular poppet damper or valve has particular utility as an isolation damper in a fabric filter dust collector and includes integral gas flow turning means which are positioned so as to minimize pressure drop. The poppet plate is pivoted at one end to the floor of an inlet manifold and has a pair of gas straightening vanes attached to its underside. One of the vanes is near the pivoted end and the other is generally parallel to the poppet plate and has lead-in and exit portions which gently turn the gas about 90°. Where the gases are to be directed to a plurality of collectors, a damper is preferably provided for each, with the angles of the various poppet plates being individually adjustable so as to divide the flow in any proportion desired.

5 Claims, 5 Drawing Figures

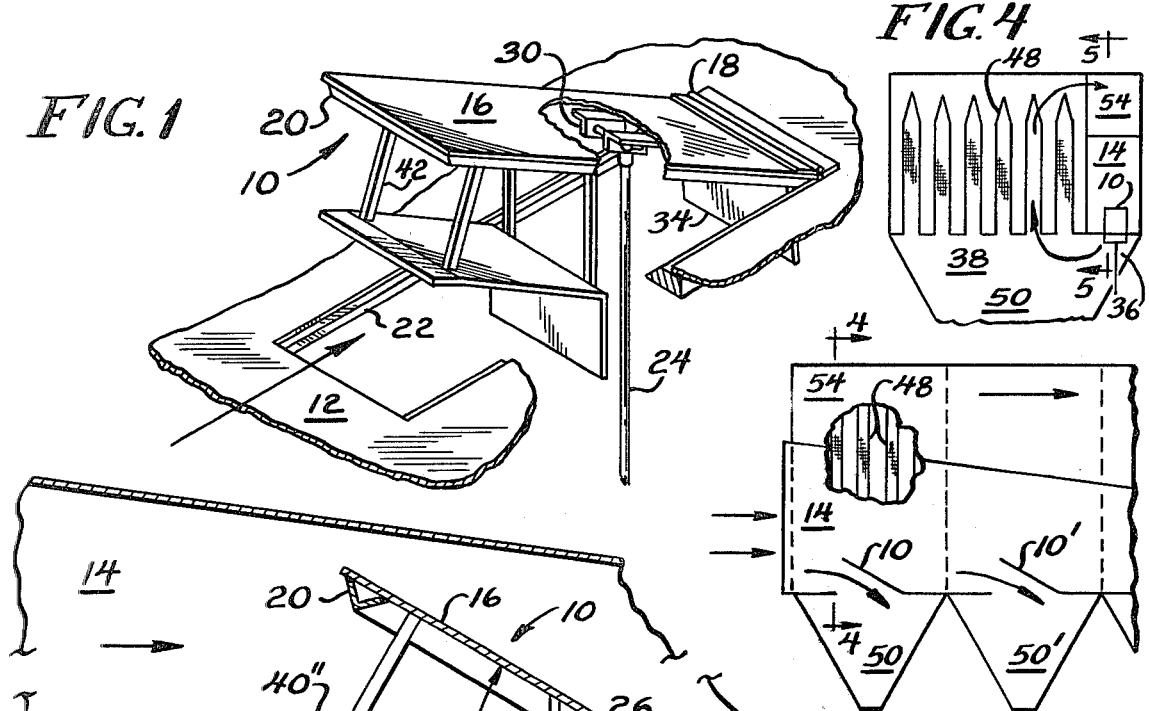
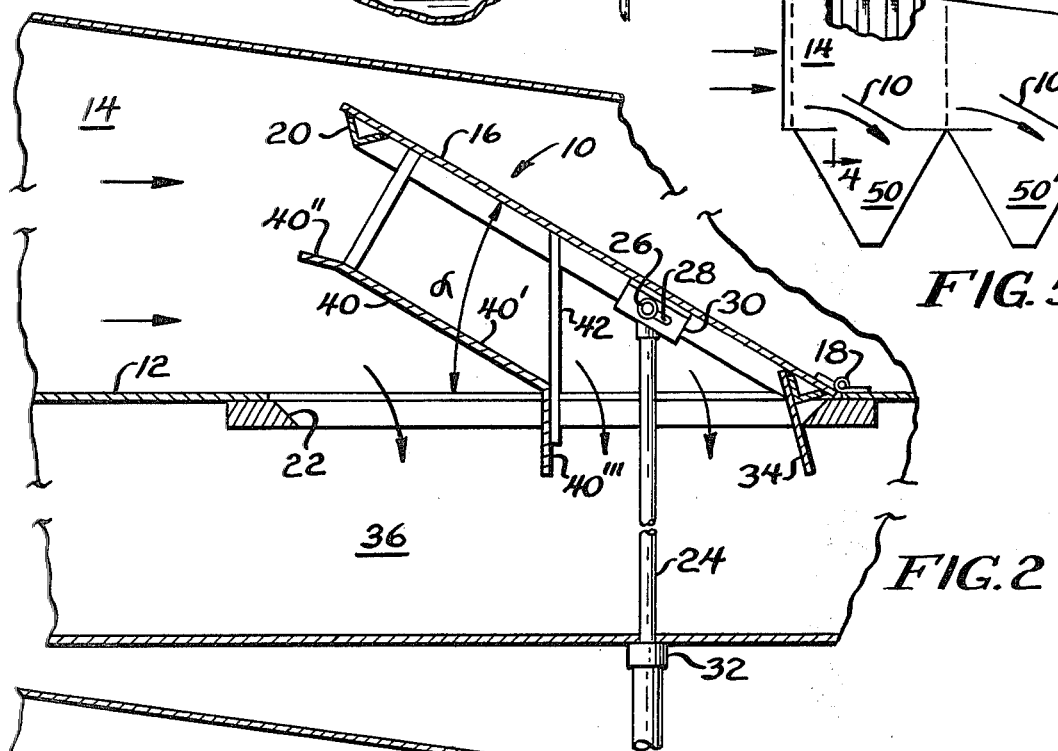
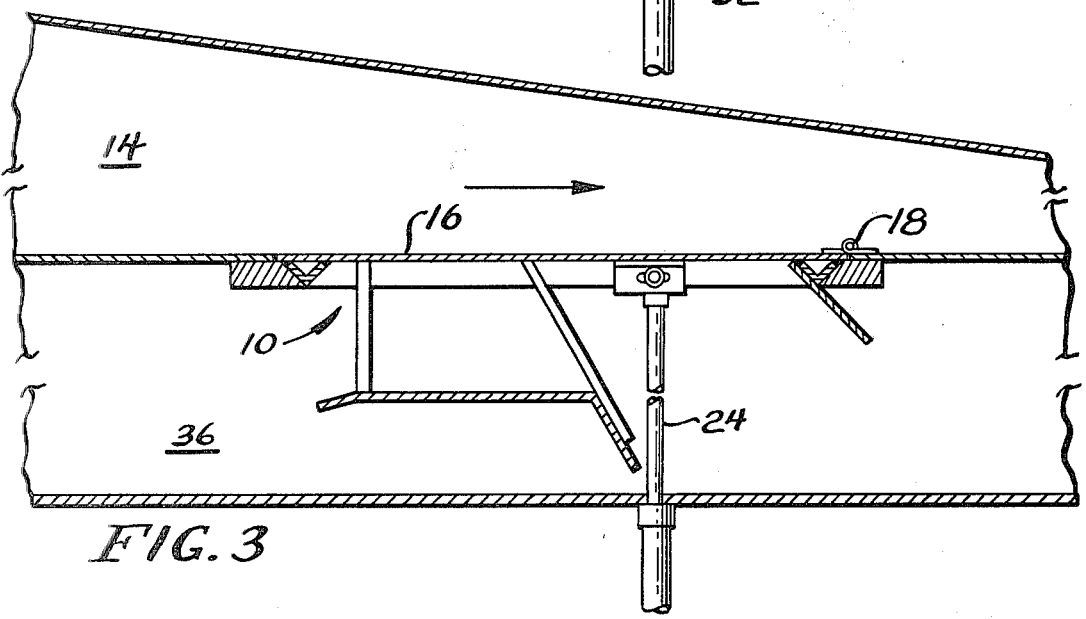

POPPET DAMPER WITH GAS FLOW TURNING MEANS

BACKGROUND OF THE INVENTION

This invention relates to poppet dampers or valves, and particularly to isolation dampers which are used to control the flow of particulate laden gases to a baghouse or series of baghouses containing fabric filter collectors. The typical dampers used in such a situation include the round flat plate poppet type, and round or rectangular butterfly types.

The more generally accepted baghouse isolation damper design is the round, flat plate poppet type, positioned either vertically or horizontally and operated (open/close/open) axially (in a linear direction) by an actuating device. This actuating device can be a manual gear type operator; a linear type pneumatic or hydraulic cylinder or a linear type electric motor driven actuator. The poppet type damper has become the standard design because of its ability to affect a gas tight seal, its simplicity of design and construction, and its high degree of operational reliability. The butterfly types, either rectangular or round, are used where tight sealing is not a critical requirement. Generally, an isolation damper is used to take off a percentage of the total gas in an inlet manifold and direct it to a particular baghouse rather than to divert 100% of the flow. Examples of devices useful for 100% diversion include U.S. Pat. Nos. 3,147,773, 3,116,756, 3,270,775, and 3,537,240.

One factor that is of great significance in the design of a particulate handling system, such as a flyash collection system for a boiler, is the pressure drop in the system. Some systems are of such a massive size that a pressure drop improvement of just one inch of water over the expected life of a plant can reduce the operating cost by $100–500,000. Thus, even a very small improvement in pressure drop can be very important.

SUMMARY

It is among the objects of the present invention to provide a damper system which can provide optimized gas flow distribution to one or more gas filtering compartments with minimal pressure drop. It is a further object to provide such a system which will be economical to produce and simple and rugged in its design.

These and other objects and advantages are provided by the damper system of the present invention which finds particular utility when mounted in the inlet manifold duct which adjoins the various compartments of a fabric filter dust collector. The number of dampers and their size is a function of the total volume of gas and the design gas velocity through the damper openings, the configuration of the inlet manifold, the dimensions of the filtering compartments, and overall space constraints.

The improved rectangular poppet damper serves as its own gas turning device and thus provides the inherent advantage of minimizing pressure loss. The rectangular poppet plate can have its angular position relative to the floor of the inlet duct varied by varying the travel of an actuating rod. Thus, gas flow to a fabric filter can be optimized throughout a wide range of boiler operating conditions, for example. The poppet plate itself, being hinged to the floor, functions as a turning vane. Also, an additional turning vane is affixed to the poppet plate near its hinged end and a further turning vane having an elongated intermediate portion and angled inlet and outlet portions is mounted in spaced, generally parallel relation to the poppet plate. The additional turning vanes permit the gas flow to be turned about 90° gently and in a rather non-turbulent manner, and thus minimize the pressure drop as compared to conventional poppet dampers. Although more than two additional vanes can be added to each poppet plate to improve the flow characteristics, the addition of too many vanes can conceivably increase the expense of the damper beyond the additional benefit derived.

BRIEF DESCRIPTION OF THE DRAWING

FIG. 1 is an isometric view showing the improved rectangular poppet damper in its "open" position relative to a duct in which it is mounted;

FIG. 2 is a partially broken away sectional side view of the "open" damper of FIG. 1;

FIG. 3 is a partially broken away view similar to FIG. 2 except showing the damper in its "closed" position;

FIG. 4 is a view taken on line 4—4 of FIG. 5 illustrating the general environment in which the damper is used; and FIG. 5 is a view taken on line 5—5 of FIG. 4.

DESCRIPTION OF THE PREFERRED EMBODIMENT

Referring to FIGS. 1 and 2, the improved poppet damper is indicated generally at 10 in an "open" position relative to the floor or bottom plate 12 of an inlet manifold or duct 14. The damper 10 has a rectangular poppet plate 16 which is hinged in the plate 12 by a hinge member 18. An angle member 20 is affixed, such as by welding, to the lower peripheral edge of the plate 16 and serves to both stiffen the plate 16 and form a seal with a seat member 22 which is affixed to the floor plate 12. The poppet plate 16 can be pivoted to any desired angle of openness relative to floor plate 12 or to its closed position as shown in FIG. 3, by means of a vertically movable actuator rod 24 which is attached by a pin 26 for movement in slots 28 of a clevis assembly 30 carried by the poppet plate 16. The rod 24 is guided by sleeve 32 at its lower end and can be actuated manually or by means of an air cylinder, for example.

A first straightening vane member 34 is carried by the poppet plate 16 near its hinged end and serves to gently turn the gas flowing from manifold 14 under the surface of plate 16 approximately 90° into an inlet chamber 36 of a baghouse 38 (FIG. 4). A second straightening vane member 40 has an elongated portion 40' which is spaced from, and generally parallel to, the poppet plate 16. The vane member 40 also has a lead-in portion 40' and an exit portion 40''' which assist in smoothly channeling a portion of the gas stream to pass between the plate 16 and the vane 40 and in gently turning it toward the chamber 36. The vane 40 is supported by support struts 42 which are mounted to the plate 16 and thus moves with the plate 16 when it is moved to its closed position shown in FIG. 3. The presence of the turning vanes 34, 40 significantly reduces the pressure drop to which gases passing from duct 14 to duct or compartment 36 are subjected since they tend to produce laminar flow and reduce turbulence. Turbulence can be further reduced by providing more vanes such as vane 40 and spacing them closer together. However, at some point the gain in reduced pressure drop is balanced by the increased cost of providing the additional vanes or by the loss in flow capacity due to the space they consume.

FIGS. 4 and 5 are merely intended to rather schematically indicate an example of a baghouse environment in which the damper 10 might be used. The baghouse 38 contains a plurality of fabric filter bags 48 which are suspended from their closed tops while their open bottoms are mounted in a tube sheet above a hopper 50. A gas such as flue gas containing particulate matter enters the tapered inlet manifold or duct 14 and is directed by the dampers 10, 10′ into a chamber or duct 36 and then into the filter bags 48. The particulate matter is captured by the bags and falls to the bottom of hoppers 50, 50′, while the clean gas passes through the bag and into the tapered outlet manifold 54. Depending on the flow distribution which is desired, the dampers 10, 10′ can be opened to varying degrees.

I claim as my invention:

1. A rectangular poppet damer having a poppet plate and means for mounting said damper flush in an opening in the wall of a first gas inlet duct so that the flow of gas through the duct can be selectively caused to pass either over the surface of the poppet plate of the damper when the damper is closed, or under the poppet plate surface into a second duct when the damper is opened, said poppet plate being pivotally hinged to said first duct along its downstream end for movement between its open and closed positions, an actuator rod attached to said poppet plate for moving said poppet plate between its open and closed positions, at least a pair of straightening vanes integrally attached to the underside of said poppet plate, one of said straightening vanes comprising a plate-like member affixed to said poppet plate adjacent its hinged end which extends into said second duct when the damper is opened, a second of said straightening vanes comprising a plate-like member which is affixed to said poppet plate and has an elongated intermediate portion which is generally parallel to said poppet plate and spaced therefrom, said second straightening vane further including integral lead-in and exit portions at its respective ends which are angularly positioned relative to said intermediate portion so that, when said damper is in its open position, a portion of the gas flowing in said first inlet duct will be caused to flow in a substantially non-turbulent manner, both above and below said second straightening vane, the exit portion of said second straightening vane being at such an angle as to cause the gas on either side thereof to enter said second duct in a direction generally perpendicular to the direction of flow in the first duct.

2. A rectangular poppet damper in accordance with claim 1 wherein the poppet plate has angle members affixed around its periphery for stiffening the plate.

3. A rectangular poppet damper in accordance with claim 2 wherein said angle members are on the under surface of said poppet plate and cooperate in sealing relationship with complementary shaped members positioned under the top surface of said first gas inlet duct.

4. A rectangular poppet damper in accordance with claim 1 wherein said actuator rod is attached by a pin to a pair of elongated slots in a clevis assembly mounted on the under surface of said poppet plate.

5. A rectangular poppet damper in accordance with claim 1 wherein said second straightening vane is mounted to the under surface of said poppet plate by a plurality of support struts.

* * * * *